(12) United States Patent
Bustreo et al.

(10) Patent No.: US 12,085,453 B2
(45) Date of Patent: Sep. 10, 2024

(54) CONTINUOUSLY TRANSPOSED CABLE WITH AN INTEGRATED SENSING DEVICE

(71) Applicant: Hitachi Energy Ltd, Zürich (CH)

(72) Inventors: Gianluca Bustreo, Venice (IT); Roberto Zannol, Montegrotto Terme (IT); Paolo Pavanello, Granze (IT)

(73) Assignee: Hitachi Energy Ltd, Zürich (CH)

( * ) Notice: Subject to any disclaimer, the term of this patent is extended or adjusted under 35 U.S.C. 154(b) by 850 days.

(21) Appl. No.: 17/058,214

(22) PCT Filed: Apr. 30, 2019

(86) PCT No.: PCT/EP2019/061013
§ 371 (c)(1),
(2) Date: Nov. 24, 2020

(87) PCT Pub. No.: WO2019/228733
PCT Pub. Date: Dec. 5, 2019

(65) Prior Publication Data
US 2021/0190604 A1 Jun. 24, 2021

(30) Foreign Application Priority Data
May 30, 2018 (EP) .................................... 18175054

(51) Int. Cl.
*G01K 11/32* (2021.01)
*G01H 9/00* (2006.01)
(Continued)

(52) U.S. Cl.
CPC ......... *G01K 11/3206* (2013.01); *G01H 9/004* (2013.01); *H01F 27/2823* (2013.01);
(Continued)

(58) Field of Classification Search
CPC ............... G01K 11/3206; G01H 9/004; H01F 27/2823; H01F 27/402; H01F 2027/2838; H01F 2027/406
See application file for complete search history.

(56) References Cited

U.S. PATENT DOCUMENTS 9,212,957 B2 * 12/2015 Takahashi .............. G01K 13/08
2002/0196994 A1 * 12/2002 Bosselmann .......... G01B 11/26
374/161
(Continued)

FOREIGN PATENT DOCUMENTS

| CN | 201584206 U | * | 9/2010 |
| CN | 202159514 U | * | 3/2012 |

(Continued)

OTHER PUBLICATIONS

International Search Report and Written Opinion of the International Searching Authority, PCT/EP2019/061013, mailed Jun. 24, 2019, 15 pages.
(Continued)

*Primary Examiner* — Malcolm Barnes
(74) *Attorney, Agent, or Firm* — Sage Patent Group

(57) ABSTRACT

A continuously transposed cable CTC, extending according to a longitudinal development direction (L) and having two opposite longitudinal ends, includes a plurality of strands arranged so to form at least a first and a second adjacent stacks, each extending along the longitudinal development direction (L), wherein said at least first and second stacks form a longitudinal interface therebetween. The CTC cable (1) further includes one or more optical fibers positioned at the interface between the first and the second stacks. A winding of an electromagnetic induction device, such as a transformer, can be obtained by winding said CTC cable.

15 Claims, 3 Drawing Sheets

(51) Int. Cl.
  *G01K 11/3206* (2021.01)
  *H01F 27/28* (2006.01)
  *H01F 27/40* (2006.01)

(52) U.S. Cl.
  CPC ... *H01F 27/402* (2013.01); *H01F 2027/2838* (2013.01); *H01F 2027/406* (2013.01)

(56) References Cited

U.S. PATENT DOCUMENTS

| | | | |
|---|---|---|---|
| 2005/0013342 A1* | 1/2005 | Kaminski | G01K 11/32 374/161 |
| 2005/0082084 A1 | 4/2005 | Drubel et al. | |
| 2014/0092938 A1* | 4/2014 | Adolf | G01K 11/12 374/162 |
| 2014/0321799 A1* | 10/2014 | Udd | G02B 6/022 385/13 |
| 2015/0235759 A1* | 8/2015 | Hinz | H01F 29/00 356/73.1 |
| 2016/0322149 A1* | 11/2016 | Zhang | H01F 27/28 |
| 2018/0033545 A1* | 2/2018 | Schrammel | H01F 27/10 |

FOREIGN PATENT DOCUMENTS

| | | |
|---|---|---|
| DE | 19507941 A1 | 9/1995 |
| JP | H0880011 A * | 3/1996 |
| JP | 2000299967 A * | 10/2000 |

OTHER PUBLICATIONS

Office Action mailed Sep. 22, 2023, Korean Patent Application No. 10-2020-7034355, 13 pages.

* cited by examiner

CONTINUOUSLY TRANSPOSED CABLE WITH AN INTEGRATED SENSING DEVICE

CROSS REFERENCE TO RELATED APPLICATIONS

This application is a 35 U.S.C. § 371 national stage application of PCT International Application No. PCT/EP2019/061013 filed on Apr. 30, 2019, which in turns claims foreign priority to European Patent Application No. 18175054.8, filed on May 30, 2018, the disclosures and content of which are incorporated by reference herein in their entirety.

BACKGROUND

Technical Field

The present invention relates to an electrical cable, particularly to a continuously transposed cable (CTC), with an integrated sensing device, in particular for measuring temperature and/or vibrations. The conductor according to the invention is in particular destined to be used for forming a winding of an electromagnetic induction device, such as a transformer.

Description of the Related Art

Electromagnetic induction devices, such as transformers, are used in power systems for voltage level control. In particular, a transformer is an electromagnetic induction device used to step up and step down voltage in electric power systems in order to generate, transmit and utilize electrical power. In general, a transformer comprises a core, made of e.g. laminated iron, and windings.

In electromagnetic induction devices the temperature of the windings should be monitored in order to find possible problems, to plan maintenance or to determine if some components are getting old. This can be done for example using indirectly temperature measuring of the cooling fluids where the winding is immersed or incorporated. Another option is to monitor the winding temperature by manually inserting optical fibers in specific and limited numbers of positions of the windings. This operation is extremely long and risky because the fiber optics can be damaged during the winding handling or during the normal assembly and setup of the electromagnetic induction device itself. In addition, it is difficult or substantially impossible to measure the temperature inside the conductors forming the windings or in the internal parts of the windings.

BRIEF SUMMARY OF THE INVENTION

The object of the present invention is therefore to provide a conductor with an integrated sensing device, particularly but not exclusively for measuring temperature, which when used in conditions similar to those disclosed above, for example when used for forming windings of a transformer, allows a precise measurement of the quantity of interest, while at the same time being easy to be installed.

This and other objects are achieved by a continuously transposed cable (CTC) in accordance with claim 1.

Dependent claims define possible advantageous embodiments of the invention.

BRIEF DESCRIPTION OF THE DRAWINGS

Further characteristics and advantages of the CTC cable according to the invention will be more apparent from the following description of preferred embodiments given as a way of an example with reference to the enclosed drawings in which.

DETAILED DESCRIPTION

Figure 1:
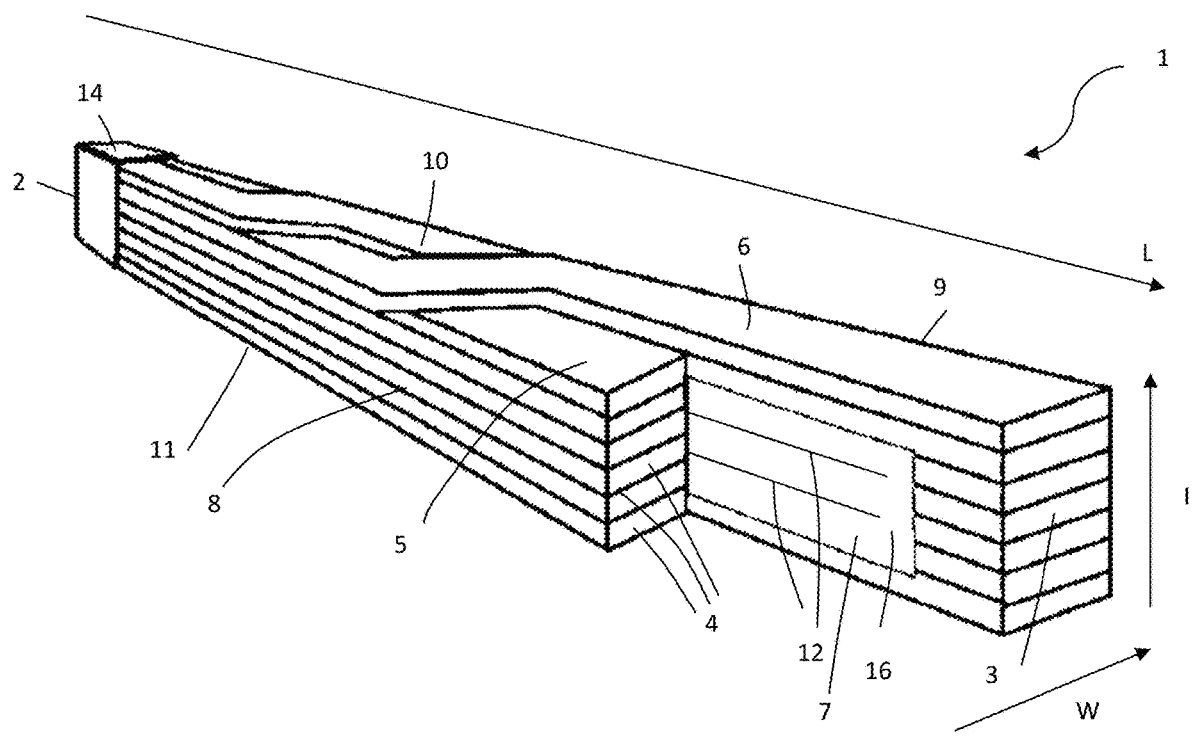
FIG. 1 shows a perspective view of a CTC cable according to a possible embodiment.

The inventive concept will be described hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

With reference to the annexed Figures, a continuously transposed cable (CTC) is indicated with reference number 1. The CTC cable 1 extends according to a longitudinal development direction L and comprises two opposite longitudinal ends 2, 3.

The CTC cable 1 comprises a plurality of single strands 4, each preferably in the form of a ribbon, i.e. having a transversal section substantially rectangular with a first dimension greater than the second dimension. Preferably, the strands 4 are externally at least in part electrically insulated, for example by one or more layers of electrical insulating enamel.

The strands 4 are arranged so to form a first 5 and a second 6 adjacent stacks, each extending along the longitudinal development direction L. Each stack 5, 6 comprises a plurality of strands 4, which are overlapped in each stack 5, 6 according to an overlapping direction I. Furthermore, said strands 4 are preferably arranged such that at least a portion of each of them alternate in the two adjacent stacks 5, 6. Still more preferably, the strands 4 are arranged such that each of them, successively along the longitudinal development direction L, takes on each possible position within a cross section of the CTC cable 1, i.e. each position along the overlapping direction I in each of the stacks 5, 6. Preferably, in case of strands having rectangular section, the smallest dimension thereof is parallel to the overlapping direction I, and the biggest dimension thereof is parallel to a lateral development direction W of the CTC cable 1, which is perpendicular to a plane formed by the longitudinal development direction L and the overlapping direction I.

The stacks 5, 6 form a longitudinal interface 16 therebetween.

Preferably, the strands 4 are held together by suitable connecting devices, such as, for example, one or more ribbons or wires 14. According to a possible embodiment, the connecting devices are electrically insulating. Therefore, for example, the ribbons or wires 14 can be made of paper, or plastic, or other suitable electrically insulating material, such as Nomex®. In some applications, alternatively, the connecting devices 14 do not perform the function of electrical isolation but only a mechanical function to hold the strands 4 together.

Preferably, the strands 4 are electrically connected in parallel at the longitudinal ends 2, 3 of the CTC cable 1.

According to an embodiment, at the interface 16 between the first 5 and the second 6 stacks the CTC cable 1 comprises an insulating separator 7, which can extend in length along the longitudinal development direction L and in width along the overlapping direction I. The insulating separator is made of an electrically insulating material, such as for example paper, up-grade paper, pressboard, Nomex® or the like. Alternatively, the insulating separator 7 can be missing.

The so formed CTC cable 1 comprises, in addition to the already cited longitudinal ends 2, 3, a first side face 8, a second side face 9, an upper face 10 and a lower face 11. The first side face 8 is the external face of the first stack 5 opposite to the interface 16 with the second stack 6. The second side face 8 is the external face of the second stack 6 opposite to the interface 16 with the first stack 5. The upper 10 and lower 11 faces are the remaining faces of the CTC cable 1 and correspond respectively to the upper and lower portions of the couple of first 5 and second 6 adjacent stacks.

The CTC cable 1 comprises one or more optical fibers 12 positioned at the interface 16 between the first 5 and the second 6 stacks.

The optical fibers 12 preferably extend parallel to the cable longitudinal development direction L. In accordance with an embodiment, the optical fibers 12 are positioned on or inserted inside the insulating separator 7 (in this case the insulating separator 7 can comprise for example two opposite portions and the optical fibers can be positioned therebetween. Alternatively, the insulating separator can comprise one or more tubular elements where the optical fibers can be inserted). This reduces the risk of damaging the optical fibers 12, for example during the forming of a winding by the CTC cable 1 according to the invention.

According to a possible embodiment (as shown for example in FIG. 2), the optical fibers 12 comprise a first portion 15 outside the CTC cable 1, for example near the first 2 or the second 3 longitudinal end thereof, and a second portion 17 extending inside the CTC cable 1 in correspondence of the interface 16 between the stacks 5, 6. The second portion 15 ends with a tip 13, positioned inside the cable 1 in a specific position along the interface 16, where the measurement by the optical fiber takes place. For example, the first portion 15 can be connected to a measuring apparatus (not shown in the Figures) suitable do detect a quantity, in particular the temperature, in correspondence of the tip 13 of the optical fiber. The principles underlying the measurement of the temperature at the tip of an optical fiber are known and will be not described here in detail. According to another embodiment, it is possible to measure the temperature along the second portion 17 up to the tip 13. Again, the principles underlying the measurement of the temperature along an optical fiber are known and will be not described here in detail.

The so configured CTC cable can be used for forming a windings of an electromagnetic induction device, such as a transformer. For example, the free portion 15 can be positioned near the first longitudinal end 2, which in turn can correspond to the winding top exit. Preferably, the free portion 15 does not exit the CTC cable exactly at the longitudinal end 2 or 3 but before such that optical fibers does not interfere with the connection of the winding with the electromagnetic induction device. The tip 13 can be positioned in the most suitable intermediate position between the first longitudinal end 2 and the second longitudinal end 3, which in turn can correspond to the winding bottom exit. With this arrangement, it is possible to check the temperature in a specific position of the winding formed with the CTC cable 1.

Figure 2:
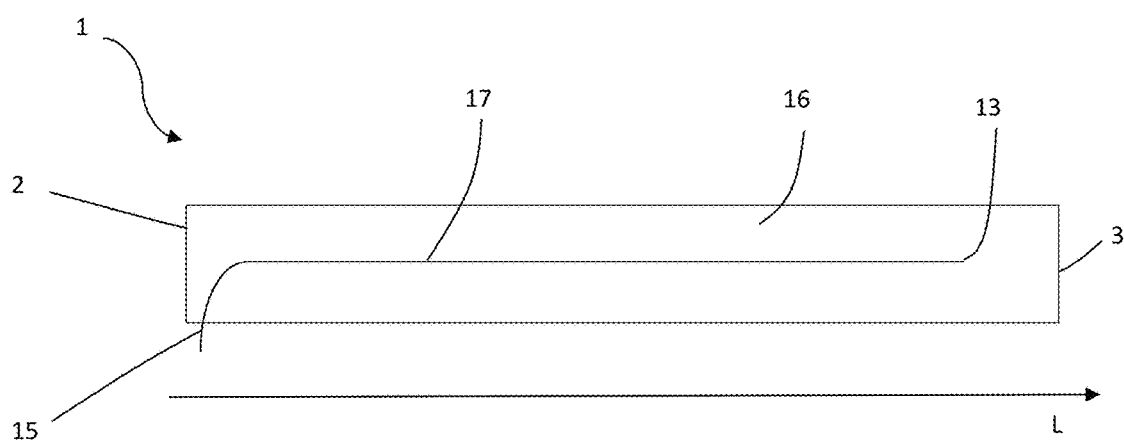
FIG. 2 shows a schematic sectional view along a longitudinal development direction of the CTC cable according to a possible embodiment.
Figure 3:
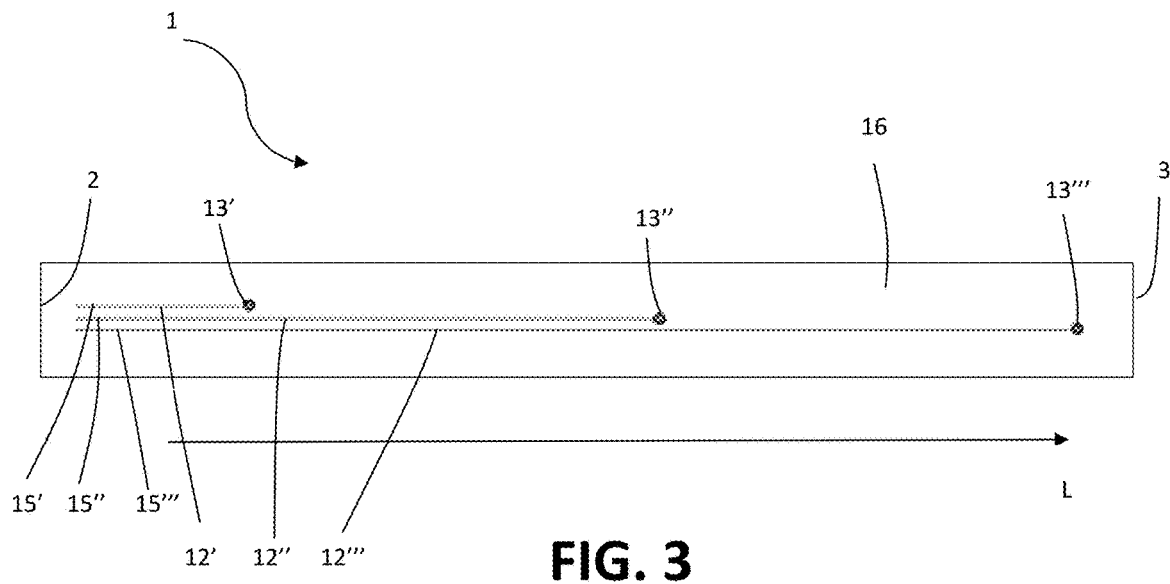
FIG. 3 shows a schematic sectional view along a longitudinal development direction of the CTC cable according to a further possible embodiment.
Figure 4:
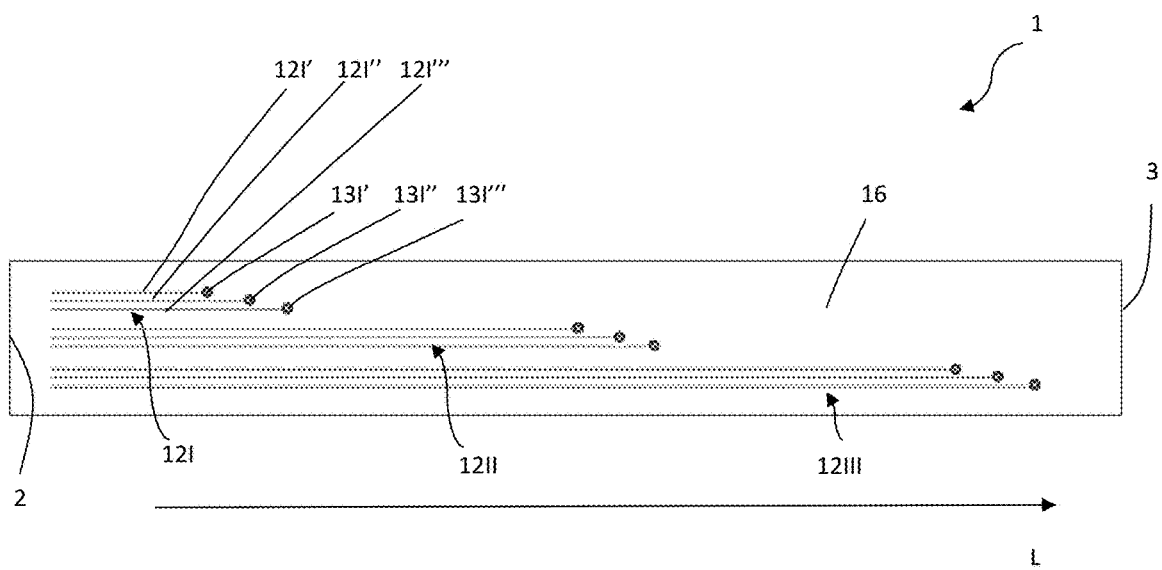
FIG. 4 shows a schematic sectional view along a longitudinal development direction of the CTC cable according to a further possible embodiment.

FIGS. 2-4 show further possible alternative embodiments of a CTC cable 1 usable for forming a transformer winding. In general, the CTC cable 1 can comprise a plurality of optical fibers 12 each having the tip 13 in a different position along the longitudinal development direction L and the free portions 15 positioned near the first and/or the second longitudinal ends 2, 3. In this manner, it is possible to take measures in different positions, in particular when the CTC cable 1 is used for forming a winding.

According to the embodiment shown in FIG. 3, the CTC cable 1 comprises three optical fibers 12', 12", 12'", each having a respective free portion 15', 15", 15'" and a tip 13', 13", 13'". The free portions 15', 15", 15'", as mentioned above, are outside the CTC cable 1 and can be connected to a measurement device. Preferably, the free portions 15', 15", 15'" are positioned near the top exit of the winding. The tips 13', 13", 13'" can be respectively positioned near the first longitudinal end 2 (which in turn will correspond to the winding top exit), in an intermediate position (which in turn will correspond to a middle position of the winding), and near the second longitudinal end 3 (which in turn will correspond to the winding bottom exit). With this arrangement, it is possible to check the temperature in three different position of the winding, namely at the top exit, in the middle, and at the bottom exit.

With reference to the embodiment shown in FIG. 4, the CTC cable 1 shown therein differs from the one shown in FIG. 3 in that it comprises three groups 12I, 12II, 12III of optical fibers arranged similarly to the three single optical fibers 12', 12", 12'" of the embodiment in FIG. 2. Each group in turn comprises a plurality (three in the example shown) of optical fibers 12I', 12I", 12I'", . . . having respective tips 13I', 13I", 13I'"; . . . and free portions positioned near the first longitudinal end 2.

Figure 5:
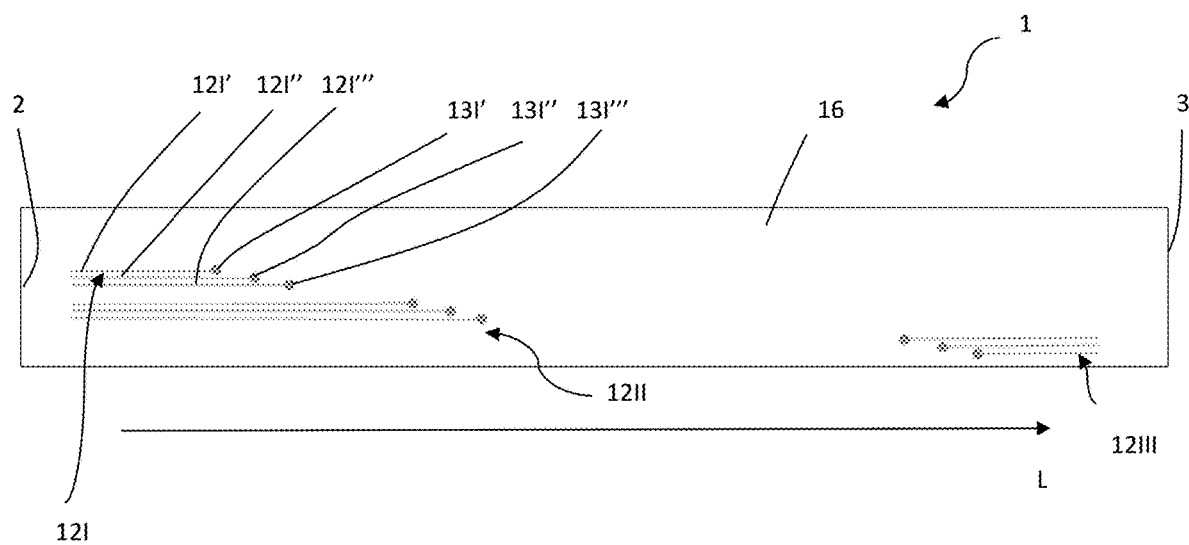
FIG. 5 shows a schematic sectional view along a longitudinal development direction of the CTC cable according to a further possible embodiment.

With reference to the embodiment shown in FIG. 5, the CTC cable 1 still comprises three groups 12I, 12II, 12III of optical fibers each having respective tips 13I', 13I", 13I'"; . . . arranged similarly to the three groups 12I, 12II, 12III with respective tips 13I', 13I", 13I'"; . . . of optical fibers of the embodiment in FIG. 4. However, in this embodiment, the free portions of the optical fibers of the first and of the second groups are positioned near the first longitudinal end 2 of the CTC cable, whereas the free portions of the optical fibers of the third group are positioned near the second longitudinal end 3 of the CTC cable. Again, the first 2 and the second 3 longitudinal ends of the CTC cable 1 can respectively correspond to the winding top exit and to the winding bottom exit, or vice versa. In this manner, it is not necessary to use too long optical fibers.

It is to be noted that the optical fibers 12 of the CTC cable 1 can be also used for obtaining a continuous temperature map along the cable (therefore, for example along the winding formed with the cable) instead of/in addition to the temperature at the tip 13. According to another option, it is possible to measure the distance of the point with maximum temperature from an end of the optical fiber, as well as the temperature in this point with maximum temperature. This allows the identification of the hot-spot in a winding formed with the CTC cable 1 according to the invention. This type of measurement can be obtained for example by using a particularly treated optical fiber known as Fiber Bragg Grating (FBG), or the like. Using optical fibers of this type or of similar types, in addition, allows the measurement of vibrations.

The FBG is a device that exploits the wavelength of light. It behaves essentially like a strain gauge and allows to realize sensors for localized measures of deformation (bending, traction, compression, torsion) and vibration. Taking advantage of the characteristics of the host material, in particular of elastomers, it is possible to measure weight, pressure and acceleration. Its characteristics also allow temperature measurements.

From the above description, the skilled person will appreciate how the CTC cable according to the invention allows the construction of windings of devices, such as transformers, having an incorporated sensing device (particularly for sensing temperature and/or vibrations). Therefore, it is no longer necessary to apply the optical fibers to already formed windings. This results in a much easier and more reliable process for forming the winding.

Furthermore, the CTC cable allows a flexible measurement, i.e. it is possible to determine multiple points or sketches where the quantity of interest is to be measured.

To the above-mentioned embodiments of the CTC cable according to the invention, the skilled person, in order to meet specific current needs, can make several additions, modifications, or substitutions of elements with other operatively equivalent elements, without however departing from the scope of the appended claims.

The invention claimed is:

1. A continuously transposed cable CTC extending according to a longitudinal development direction (L) and having two opposite longitudinal ends, said CTC cable comprising a plurality of strands arranged so to form at least a first and a second adjacent stacks, each stack extending along the longitudinal development direction (L), wherein said at least first and second stacks form a longitudinal interface (16) therebetween wherein the longitudinal interface comprises one or more optical fibers positioned at the interface between the first and the second stacks, wherein the CTC cable comprises three groups of optical fibers each comprising a plurality of optical fibers, each optical fiber of the groups of optical fibers having a respective free portion outside the CTC cable and a tip, respectively positioned near the first longitudinal end, in an intermediate position between the first and the second longitudinal end, and near the second longitudinal end.

2. The CTC cable according to claim 1, wherein the one or more optical fibers extend parallel to said longitudinal development direction (L).

3. The CTC cable according to claim 1, comprising an insulating separator, made of electrically insulating material, at said interface extending along the longitudinal development direction (L).

4. The CTC cable according to claim 3, wherein the one or more optical fibers are positioned on the insulating separator.

5. The CTC cable according to claim 4, wherein the insulating separator comprises two opposite portions and the one or more optical fibers are positioned therebetween, or wherein the insulating separator comprises one or more tubular portions and the one or more optical fibers are positioned inside said one or more tubular portions.

6. The CTC cable according to claim 1, comprising a plurality of optical fibers having a tip, wherein the tips of each optical fiber is positioned in a different position along the longitudinal development direction (L).

7. The CTC cable according to claim 1, wherein the tips of the plurality of optical fibers of each group are longitudinally shifted one relative to another.

8. The CTC cable according to claim 1, comprising a measuring apparatus connected to the one or more optical fibers, said measuring apparatus being suitable to measure a quantity detected by the one or more optical fibers.

9. The CTC cable according to claim 8, wherein said quantity includes: the temperature in correspondence of a tip, the temperature along the second portion up to the tip, deformations and/or vibrations in correspondence of the tip.

10. A winding of an electromagnetic induction device formed by winding a CTC cable according to claim 1.

11. The winding according to claim 10, having a winding top exit and a winding bottom exit, wherein one of the first and the second longitudinal end of the CTC cable corresponds to the winding top exit and the other of the first and the second longitudinal end corresponds to the winding bottom exit.

12. The electromagnetic induction device comprising one or more windings according to claim 10.

13. The electromagnetic induction device according to claim 12, wherein the electromagnetic induction device is a transformer.

14. The CTC cable according to claim 1, wherein the one or more optical fibers comprise a first portion outside the CTC cable at the first and/or at the second longitudinal end thereof, and a second portion extending inside the CTC cable in correspondence of said interface between the first and the second stacks, and wherein the second portion of the one or more optical fibers ends with a tip.

15. A continuously transposed cable CTC extending according to a longitudinal development direction (L) and having two opposite longitudinal ends, said CTC cable comprising a plurality of strands arranged so to form at least a first and a second adjacent stacks, each stack extending along the longitudinal development direction (L), wherein said at least first and second stacks form a longitudinal interface (16) therebetween wherein the longitudinal interface comprises one or more optical fibers positioned at the interface between the first and the second stacks, wherein the CTC cable comprises three optical fibers each comprising a plurality of optical fibers, each optical fiber of the three optical fibers having a respective free portion outside the CTC cable and a tip, respectively positioned near the first longitudinal end, in an intermediate position between the first and the second longitudinal end, and near the second longitudinal end.

* * * * *